Nov. 4, 1969    L. J. CONN    3,476,420
RIGID SHAFT COUPLER
Filed Jan. 3, 1969
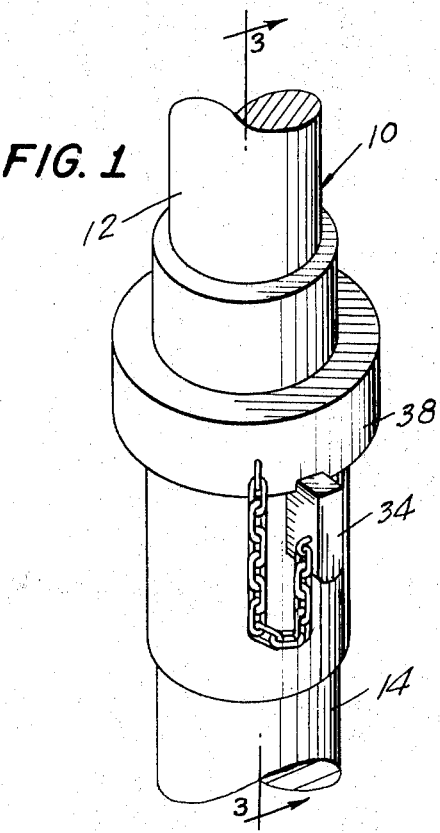
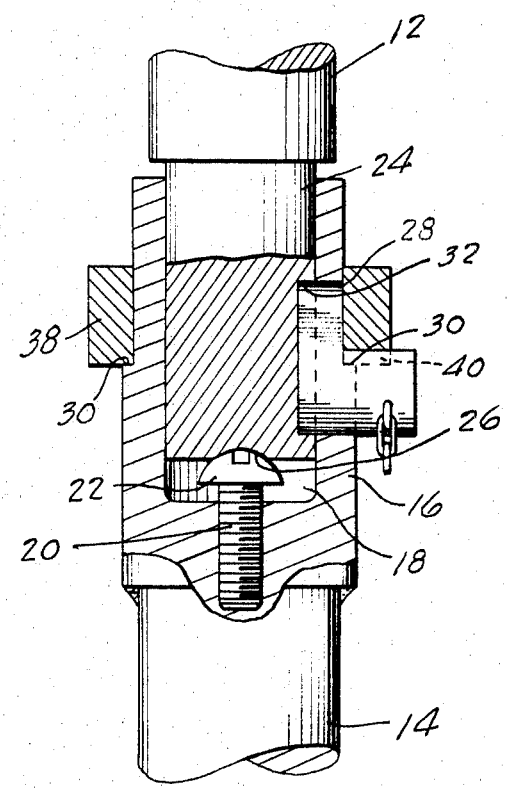
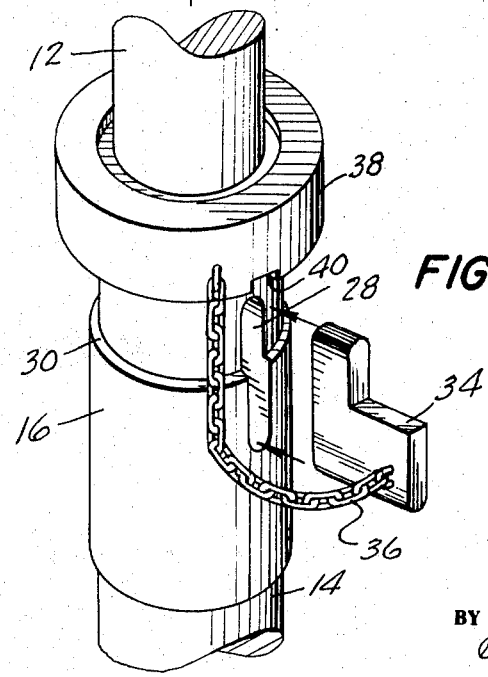
INVENTOR
LEROY JAMES CONN, United States Patent Office 3,476,420
Patented Nov. 4, 1969

3,476,420
RIGID SHAFT COUPLER
Leroy J. Conn, 11 S. Marion St., Warren, Pa. 16365
Filed Jan. 3, 1969, Ser. No. 788,720
Int. Cl. F16b 7/00; F16d 1/00
U.S. Cl. 287—119                     3 Claims

ABSTRACT OF THE DISCLOSURE

A rigid shaft coupler for coupling a rod to a sleeve comprising an axially disposed adjusting screw in a first shaft with said sleeve on the end thereof, with the head of the screw seated in a spherical socket in the center of the rod to be coupled to the shaft, permitting the rod to be rotated, with key means disposed in the sleeve and adapted to be received in a key way in the rod.

---

The present invention relates to coupling means, and more particularly to means for rigidly coupling a pair of shafts together in end-to-end relationship. However, the device according to the present invention is readily adaptable for the coupling together of a rod and a sleeve on the end of another rod or shaft in rigid end-to-end relationship.

The present invention is an improvement over my earlier patent, No. 2,504,501, and involves the addition of an axially disposed adjusting screw in a shaft with a sleeve on the end thereof, which adjusting screw has a head which seats in a spherical socket in the center of a rod to be coupled thereto, so as to permit the latter to be rotated so as to align its key way with the key way in the first-mentioned shaft.

It is a further object of the present invention to provide an improved rigid shaft coupling which is readily detachably connected together without the use of conventional coupling means.

Still, a further object of the present invention is to provide a simple, yet rigid, coupling means in which adjustable means are provided so as to align the shafts or the rod and the shaft with the sleeve thereon axially of each other, and to further permit the rod to be rotated so that the key will be properly inserted within the key way in the rod and thus eliminate the necessity for precise machining and to permit variations in the construction of the coupled parts.

Various other objects and advantages of the present invention will be readily apparent from the following detailed description, when considered in connection with the accompanying drawing forming a part thereof, and in which:

FIGURE 1 is a perspective view of the coupling means embodied in the present invention with the parts rigidly coupled together.

FIGURE 2 is a view similar to FIGURE 1, but illustrating the parts in an exploded view when they are not in a rigid connection with each other; and FIGURE 3 is a vertical sectional view through a coupler embodying the present invention taken substantially on the plane of the line 3—3 of FIGURE 1.

Referring to the drawing, the reference numeral 10 generally designates the rigid shaft coupler of the present invention which comprises a first shaft or rod 12 and a second shaft or rod 14, having a sleeve 16 disposed on the end thereof.

The shaft 14 is enlarged adjacent the end with the sleeve 16 thereon, as can be clearly seen in FIGURE 3. The bore 18 of the sleeve 16 has disposed therein a threaded screw member 20 having a head 22 thereon. The screw member 20 is disposed in an axial bore within the end of the sleeve 14, as best seen in FIGURE 3.

The rod or shaft 12 is provided with a reduced end 24 which has a spherical socket 26 therein for receiving the spherical head of the screw member 20, so as to permit rotation of the rod 12 with respect to the head 22.

The sleeve 16 is provided with an axially extending key way or slot 28 therein, as best seen in FIGURE 2. It will be noted that the sleeve 16 is provided with a shoulder 30 at approximately the mid-point of the slot 28.

The reduced end portion 24 of the rod or shaft 12 is provided with a complementary axial key way or slot 32 therein, as best seen in FIGURE 3.

An L-shaped key 34, as best seen in FIGURE 2, is adapted to be inserted within the corresponding key ways 28 and 32 of the reduced end portion and the sleeve 16. The key 34 is connected by a link chain 36 to an annular ring 38 having a slot 40 therein, as best seen in FIGURE 2.

When it is desired to provide a rigid shaft coupler between the rod or shaft 12 and the rod or shaft 14, the axially disposed adjusting screw 20 is threaded into its bore a predetermined amount, so that the head 22 is disposed in the proper axial relationship with respect to the shaft 12 to be connected thereto. The screw member 20 is disposed in its bore so that when the shaft 12 is positioned within the end of the sleeve 16, the key way or slot 32 of the shaft 12 will be properly aligned with the corresponding key way or slot 28 in the sleeve 16. Referring to FIGURE 2, the key 34 is then moved in the direction indicated by the arrows therein into the aligned key ways, and the shaft 12 is rotated so as to align its key way with the key way in the shaft 14, if they are not already in proper alignment. At this time, the spherical socket 26 in the center of the rod or shaft 12 to be coupled to the rod or shaft 14 will permit the head 22 of the screw member 20 to be disposed therein, so that the shaft or rod 12 can be readily rotated with respect to the sleeve 16 and the head 22.

When the key 34 is properly disposed within the key ways, the ring 38 is moved axially of the sleeve 16 until it has its slot 40 engaging the key 34, as seen in FIGURE 3. At this time, the edge of the annular ring 38 will bear against the shoulder 30 in the sleeve 16 and thus the two rods or shafts will be rigidly connected to each other, until it is desired to detach the rods again.

Inasmuch as it will be apparent that various changes may be made in the form, location and relative arrangement of several parts without departing from the essential characteristics of the invention, it is to be understood that this invention is not to be limited except by the scope of the appended claims.

What is claimed is:
1. A rigid shaft coupler device for coupling a first rod to a second rod comprising a first rod formed with a peripheral key-receiving slot therein, a second solid rod terminating in a sleeve slidably engaged over said first rod and formed with a key way therethrough for registering with said slot, a key slidable through said key way and engaged in said slot, a key retaining ring slidable about said sleeve and over said key for retaining said key positioned in said sleeve and axially adjustable threaded means for axially positioning said first rod with respect to said sleeve, said threaded means being threaded into a blind bore in the end of said second solid rod and having a headed end facing said first rod.

2. The device of claim 1 wherein said threaded means is movable axially in said sleeve and said rod has a spherical socket therein adapted to receive said headed end of said threaded means and permit said rod to rotate with respect to said threaded means.

3. The device of claim 2 wherein said threaded means is a screw with a spherical head thereon and threaded into the end of said second rod, and chain means connecting said ring and key to each other.

References Cited

UNITED STATES PATENTS

| | | | |
|---|---|---|---|
| 2,504,501 | 4/1950 | Conn | 287—119 |
| 2,667,357 | 1/1954 | Andreasson. | |
| 3,195,909 | 7/1965 | Winnen | 279—76 XR |

DAVID J. WILLIAMOWSKY, Primary Examiner

A. V. KUNDRAT, Assistant Examiner

U.S. Cl. X.R.

279—82; 287—52.05